3,269,996
THREE-COMPONENT POLYMERIZATION CATALYSTS CONTAINING COORDINATION COMPLEXES
Arthur W. Langer, Jr., Watchung, N.J., assignor to Esso Research and Engineering Company, a corporation of Delaware
No Drawing. Filed Sept. 18, 1962, Ser. No. 224,547
10 Claims. (Cl. 260—93.7)

This invention relates to improved catalyst systems for the low pressure polymerization of a α-monoolefins. More particularly it relates to the indicated polymerization with a generalized Ziegler-type catalyst comprising the usual metal organic compounds and transition metal compounds, in combination with coordination complexes.

The low pressure polymerization of alpha olefins with Ziegler-type catalysts (i.e., catalysts consisting of a metal, metal hydride, metal alkyl, aryl or aralkyl of Groups I–III in combination with a transition metal compound of Groups IV–VIII) to high density isotactic, high molecular weight, solid, relatively linear products is well known, see Belgian Patent No. 533,362, "Scientific American," September 1957, pages 98 et seq.

High molecular weight polymers have acquired increasing interest for use in fibers, coatings, films, etc. In the preparation of these polymers, it is important to conduct the polymerization process with a sterospecific catalyst system such that substantially all of the polymers produced therein are highly isotactic (i.e., an isotactic polymer is one in which the monomeric units appear in long blocks having a regular stereo order), thus eliminating the necessity to reject low molecular weight oils and atactic (i.e., those non-crystalline polymers in which the monomeric units appear in no regular stereo order) or stereoblock polymers (i.e., isotactic polymers of low crystallinity which have alternating short blocks of opposite stereo order).

The use of various agents in combination with specific Ziegler-type catalysts in order to achieve greater catalyst activity and stereospecificity (a stereospecific polymerization catalyst is one which produces substantially only the desired stereo-type polymer) is well known to the art. These agents are generally Lewis bases or salts containing electron donor elements of Groups Va (e.g., N, P, As, Sb, and Bi) VIa (e.g., O, S, Se, Te, and Po).

In this invention, a new class of additives has been found which has the unexpected ability for markedly increasing stereospecificity, and in some instances, catalytic activity, of Ziegler-type catalysts. These additives are of the type called coordinate covalent compounds, or coordination complexes. Thus, α-monoolefins may be polymerized in the presence of a catalyst system containing a Ziegler-type catalyst and a coordination complex to yield highly crystalline, isotactic products which are substantially free of non-crystalline polymers. The marked increase in stereospecificity resulting from the addition of coordination complexes to Ziegler-type catalysts (e.g., $C_2H_5AlCl_2/TiCl_3$) is surprising in two respects: the coordination complexes are, per se, catalytically inert and produce no polymers in the absence of Ziegler-type catalysts; additionally, many Ziegler-type catalysts that are effective for producing solid polyethylene fail to produce solid polymers from the higher α-monoolefins, e.g., propylene, butene-1, etc. However, for example, when propylene is polymerized in the presence of a catalyst system comprising Ziegler-type catalysts and the coordination complexes, highly crystalline, isotactic polypropylene is obtained.

According to this invention, monomers of 2–8 carbon atoms, either singly or in admixture, are polymerized to solid, highly crystalline, isotactic polymers in the presence of a catalyst system consisting essentially of three components; block copolymerizations are especially facilitated by this catalyst system.

The first component of the catalyst system consists of a metal, metal hydride, metal alkyl, aryl or aralkyl, or alkyl metal halide or alkoxide, wherein the metal is selected from Groups I–III and the alkyl, aryl, aralkyl or alkoxide radicals contain 1–8 carbon atoms. Preferably the first component is an alkyl metal compound wherein the metal is selected from Groups II–III. Particularly preferred is a compound selected from the group consisting of diethyl aluminum chloride, ethyl aluminum dichloride and diethyl zinc.

The second component, which comprises a transition metal compound of Groups IV–VIII, is preferably selected from the group consisting of titanium, vanadium and chromium halides and alkoxides of 1–8 carbon atoms. Particularly preferred is titanium trichloride.

The third component, which contributes to the novelty of the instant invention is a coordination complex selected from the group having the formulas $R_nY$—$MX_3$ and $R'_nQZ$—$MX_3$, wherein Y is an element selected from the group consisting of nitrogen, phosphorus, oxygen or sulfur $n$ is either 2 or 3, and R is selected from the group consisting of alkyl, aryl or aralkyl radicals containing 1–8 carbon atoms. Z is selected from the group consisting of oxygen and sulfur, Q is selected from the group consisting of phosphorus, carbon and nitrogen, and R' is selected from the group consisting of alkyl, aryl, alkoxy and dialkylamido radicals containing from 1–8 carbon atoms. M is a metal selected from the group consisting of B, Al, Ga and In, and X is selected from the group consisting of halides and alkoxides of 1–8 carbon atoms. Generally, the molar ratio of the organic portion, i.e., $R_nY$ or $R'_nQZ$, to the metallic portion, i.e., $MX_3$ of the coordination complex is in the range of 0.2:1 to 5:1.

In practicing one embodiment of the instant invention, the third component (i.e., the coordination complex) is preferably selected from the group consisting of aluminum halide coordination complexes of amines, amides, phosphates and phosphine oxides, the molar ratio of the aluminum halide to the amines, amides, phosphates, and phosphine oxides being in the range of 0.5:1 to 2:1. Particularly preferred is the aluminum chloride coordination complex of the group consisting of triethyl amine and hexamethylphosphoramide, the molar ratio of the aluminum chloride to triethyl amine or hexamethylphosphoramide being 1:1. The preferred coordination complexes have appreciable solubility in the polymerization medium containing the alkyl metal (i.e., the first component) catalyst component. They may be added to the alkyl metal-transition metal catalyst mixture (i.e., the mixture of the first two components) or to either component separately, the choice largely dependent upon the solubility of the coordination complex and its adsorption on the surface of the transition metal component. It is generally preferred to add the coordination complex to the total catalyst mixture or to the alkyl metal component, although it has also been added successfully to the transition metal component. Generally, the molar ratio of the alkyl metal to the transition metal is in the range of 0.1:1 to 10:1 and the molar ratio of the alkyl metal to the coordination complex is in the range of 0.2:1 to 5:1. Preferably the molar ratios are in the range of 0.2:1 to 4:1 and 0.5:1 to 2:1, respectively. Particularly preferred is a catalyst system wherein the molar ratio of the alkyl metal to transition metal is 1:2 and the molar ratio of the alkyl metal to the coordination complex is 1:1.

While the coordination complexes may be used in combination with the alkyl metal halides of Groups II and III and with some alkyl metals of Group II, they are generally less effective with the trialkyl metals of Group III.

After the components of the catalyst system have been combined and slurried in an inert organic liquid, the polymerization reaction is carried out in a polymerization medium, which should be an inert organic liquid at the operating conditions, e.g., aliphatic, hydroaromatic and aromatic hydrocarbons such as pentane, hexane, heptane, higher paraffins, isoparaffins, cyclohexane, tetrahydronaphthalene, decahydronaphthalene, benzene, xylene, halogenated aromatic hydrocarbons, e.g., mono- or dichlorobenzenes, and mixtures of these and other diluents. Sufficient amounts of the diluent are employed such that the concentration of the catalyst slurry is normally in the range of 0.1–25 g./l. The monomer concentration in the diluent is not critical and concentrations of 0.1 to 100% may be employed. Although the polymerization temperatures and pressures are not critical, the reaction is generally carried out with temperatures ranging from 0–150° C. and pressures ranging from °–1000 p.s.i.g. or higher if necessary. Preferably, the olefin should remain in contact with the catalyst system for a period of time ranging from 15 minutes to 5–10 hours. While the catalyst system of the present invention is useful for polymerizing monomers containing 2–8 carbon atoms, either singly or in admixture thereof, preferably the monomers should be linear α-olefins such as propylene, butene-1, heptene-1, etc., branched α-olefins such as 3-methylbutene-1, 4-methylepentene-1, etc., styrene, and vinyl or polar monomers. Particularly preferred are propylene and butene-1.

This invention and its advantages will be better understood by reference to the following examples:

EXAMPLE 1

The coordination complex, $(C_2H_5)_3N$—$AlCl_3$, was prepared by mixing equimolar amounts (2 mmol.) of triethylamine (0.20 g.) and aluminum chloride (0.26 g.) in 10 ml. xylene. Four mmol. (0.62 g.) of Stauffer α-TiCl₃, dry ball milled 6 days, was added and the slurry was stirred for 5 minutes. Finally, 2 mmol. of $(C_2H_5)_2AlCl$ (0.24 g.) was added, and the mixture was rinsed into a 300 ml. rocking bomb with 40 ml. n-heptane. About 50 g. of liquid propylene was charged into the bomb at room temperature and the temperature was then raised to 80° C. over a 45 minute period. The bomb was maintained at 85° C. for an additional 2 hours, whereupon heating was discontinued and the bomb allowed to cool, while rocking, to room temperature. The product was isolated by the addition of a solution of 5 ml. 2,4-pentadione in 1 l. isopropanol, followed by 5 minutes stirring in a Waring blender and subsequent filtration. The polymer was again washed with fresh, hot isopropyl alcohol, then with acetone plus inhibitor, and vacuum dried at 80° C.

In a similar fashion, propylene was polymerized as described above with the exception that the catalyst system did not contain the $(C_2H_5)_3N$—$AlCl_3$ coordination complex. The results are given in Table I wherein column A represents the polymerization carried in the presence of the coordination complex and column B represents the polymerization carried out in the absence of the coordination complex. Comparison of columns A and B indicates that substantially no oily polymer was formed when the coordination complex was present whereas over 4% was obtained in the absence of the coordination complex. In addition, the higher values of density and tensile strength obtained when the coordination complex was present in indicative of exceptionally high isotacticity, thus exhibiting the marked improvement in stereospecificity which resulted when the coordination complex was present in the catalyst system.

EXAMPLE 2

The coordination complex, $[(CH_3)_2N]_3PO$—$AlCl_3$, was prepared by mixing 2 mmol. hexamethylphosphoramide (0.36 g.) with 2 mmol. AlCl₃ (0.26 g.) in 10 ml. xylene. This coordination complex was first mixed with 2 mmol. of $(C_2H_5)_2Zn$ (0.24 g.) and then 4 mmol. TiCl₃ (0.62 g.) was added. Polymerization was carried out under the same conditions as described in Example 1 except that xylene, rather than n-heptane, was used as a diluent. The results are given in Table I wherein column C represents the polymerization carried out in the presence of the coordination complex and column D represents the polymerization carried out in the absence of the coordination complex at the same Zn/Ti ratio. In the presence of the coordination complex, the oily polymer yield was 6.2%, whereas the oily polymer yield was 16.4% in the absence of the coordination complex. In addition, the values for the density and tensile strength, as given in column C, are some of the highest known to the art. By comparison, the values for the density and tensile strength, as shown in column D, indicate that the $(C_2H_5)_2Zn/TiCl_3$ catalyst, in the absence of the coordination complex, yields almost exclusively non-crystalline polymer.

*Table I.—Propylene polymerization*

| Run | A | B | C | D |
|---|---|---|---|---|
| Catalyst: | | | | |
| (a) Additive | $(C_2H_5)_3N$-$AlCl_3$ | None | $[(CH_3)_2N]_3PO$-$AlCl_3$ | None. |
| (b) Al Alkyl | $(C_2H_5)_2AlCl$ | $(C_2H_5)_2AlCl$ | $(C_2H_5)_2Zn$ | $(C_2H_5)_2Zn$. |
| (c) Ti Cpd | α-TiCl₃ | α-TiCl₃ | α-TiCl₃ | α-TiCl₃. |
| mmols., a/b/c | 2/2/4 | 0/2/4 | 2/2/4 | 0/3/6. |
| Yields, g.: | | | | |
| Oil plus wax | 0.2 | 2.1 | 0.7 | 8.0. |
| Solid | 34 | 49 | 10.6 | 40.6. |
| Properties of Solid:[1] | | | | |
| Intrinsic Viscosity, dl./g | 5.06 | 5.23 | 3.43 | 1.70. |
| Kinsinger, mol. wt.×10⁻³ | 675 | 690 | 410 | 170. |
| Density | 0.9041 | 0.8945 | 0.9067 | 0.8855. |
| Tensile at Yield, 2″/min., p.s.i | 4,550 | 3,260 | 5,000 | 1,820. |

[1] Intrinsic viscosity was measured at 0.1–0.2 mg./ml. in Decalin at 135° C. and molecular weight determined from the relationship of Kinsinger, Thesis, Univ. of Pennsylvania, 1957. Density and tensile were determined on compression molded pads which were conditioned 24 hours at 23° C. (not annealed).

EXAMPLE 3

A series of experiments were run in the same manner as Example 2 but aluminum alkyl activators were used in place of diethyl zinc. The results are given in Table II, columns E–H. The corresponding controls i.e., those experiments run in the absence of a coordination complex, are given in Table I, column B, and Table II, columns I and J.

The results given in column E show that an alkyl-metal bond must be present in the activator. When this bond was absent, no solid polypropylene was obtained; the only product obtained was a low molecular weight oil, presumably formed by cationic polymerization initiated by AlCl₃.

The results indicated in column F are especially significant since the catalyst system exhibited surprisingly good catalytic stereospecificity, i.e., polypropylene with a very high degree of crystallinity was obtained with a catalyst system utilizing $C_2H_5AlCl_2/TiCl_3$ under conditions where disproportionation to higher alkyl aluminum compounds does not occur. Thus, the active site involving the combination $C_2H_5AlCl_2/TiCl_3$ has been converted from a non-stereospecific site (as shown by column I) to one of very high stereospecificity by the addition of the cordination complex. Since the coordination complex was shown in column E to be non-stereospecific in the absence of an alkyl metal, and has been shown in a separate experiment to be inactive in the absence of the free $AlCl_3$, its effect on $C_2H_5AlCl_2$ is most remarkable. The increase in catalytic activity is also unexpected. Calculation of the catalyst efficiencies of columns F and I, on the basis of grams of polymer per gram of $C_2H_5AlCl_2/TiCl_3$, affords a value of 34.9 in column F versus 7.6 in column I.

The results obtained with $(C_2H_5)_2AlCl$ activator (column G) are essentially identical to those obtained with a different coordination complex (column A), illustrating the generality of this type of complex when used with the proper activator.

polymer crystallinity is much higher when a catalyst system containing the aluminum chloride-hexamethylphosphoramide coordination complex is used rather than a catalyst system containing hexamethylphosphoramide by itself.

In a similar fashion, other Lewis-bases, e.g., tertiary amines, ethers, phosphines, etc., known in the art as effective additives for increasing the stereospecificity of Ziegler-type catalysts, proved less effective than those corresponding coordination complexes. Thus, the superiority of the coordination complexes of the instant invention over their corresponding Lewis-bases has been demonstrated.

*Table III.—Propylene polymerization*

| Run | F | G | K | L |
| --- | --- | --- | --- | --- |
| Catalyst: | | | | |
| (a) Additive | $[(CH_3)_2N]_3PO\text{-}AlCl_3$ | $[(CH_3)_2N]_3PO\text{-}AlCl_3$ | $[(CH_3)_2N]_3PO$ | $[(CH_3)_2N]_3PO$. |
| (b) Al Alkyl | $C_2H_5AlCl_2$ | $(C_2H_5)_2AlCl$ | $C_2H_5AlCl_2$ | $(C_2H_5)_2AlCl$. |
| (c) Ti Cpd | $\alpha\text{-}TiCl_3$ | $\alpha\text{-}TiCl_3$ | $\alpha\text{-}TiCl_3$ | $\alpha\text{-}TiCl_3$. |
| mmol. a/b/c | 2/2/4 | 2/2/4 | 2/2/4 | 2/2/4. |
| Properties of Solid: | | | | |
| Kinsinger, mol. wt. $\times 10^{-3}$ | 710 | 910 | 830 | 545. |
| Density | 0.9038 | 0.9035 | 0.9005 | 0.8939. |
| Tensile at Yield, 2″/min., p.s.i. | 4,660 | 4,590 | 3,690 | 2,680. |

EXAMPLE 5

Attempts to replace the Group III metal component of the coordination complexes by salts of Group II and IV metals, generally resulted in a serious loss of activity and, in no case, was there an improvement. For example, calcium chloride-hexamethylphosphoramide or stannic chloride-triethylamine destroyed the activity of the $(C_2H_5)_2AlCl/TiCl_3$ catalyst. Therefore, the metal component of the coordination complex appears to be limited to the Group III metals.

*Table II.—Propylene polymerization*

| Run | E | F | G | H | I | J |
| --- | --- | --- | --- | --- | --- | --- |
| Catalyst: | | | | | | |
| (a) Additive | $[(CH_3)_2N]_3PO\text{-}AlCl_3$ | $[(CH_3)_2N]_3PO\text{-}AlCl_3$ | $[(CH_3)_2N]_3PO\text{-}AlCl_3$ | $[(CH_3)_2N]_3PO\text{-}AlCl_3$ | None | None. |
| (b) Al Alkyl | $AlCl_3$ | $C_2H_5AlCl_2$ | $(C_2H_5)_2AlCl$ | $(C_2H_5)_3Al$ | $C_2H_5AlCl_2$ | $(C_2H_5)_3Al$. |
| (c) Ti Cpd | $\alpha\text{-}TiCl_3$ | $\alpha\text{-}TiCl_3$ | $\alpha\text{-}TiCl_3$ | $\alpha\text{-}TiCl_3$ | $\alpha\text{-}TiCl_3$ | $\alpha\text{-}TiCl_3$. |
| mmol., a/b/c | 2/2/4 | 2/2/4 | 2/2/4 | 2/2/4 | 0/5/10 | 0/1.25/2.5. |
| Yields, g.: | | | | | | |
| Oil plus wax | 28 | 1.8 | 0.4 | 0.9 | 5.0 | 0.8. |
| Solid | 0 | 21.6 | 43 | 52 | 16.5 | 50. |
| Properties of Solid: | | | | | | |
| Intrinsic Viscosity, dl./g. | | 5.28 | 6.42 | 3.60 | 5.98 | 4.06. |
| Kinsinger, mol. wt. $\times 10^{-3}$. | | 710 | 910 | 440 | 810 | 500. |
| Density | | 0.9038 | 0.9035 | 0.8903 | 0.8855 | 0.8957. |
| Tensile at Yield, 2″/min., p.s.i. | | 4,660 | 4,590 | 2,330 | 1,870 | 2,950. |

EXAMPLE 4

Since hexamethylphosphoramide is well known in the art as a very effective Lewis-base additive for improving the stereospecificity of Ziegler-type catalysts, experiments were performed, in the same manner as indicated in Table II, columns F and G, wherein the aluminum chloride-hexamethylphosphoramide coordination complex was compared with hexamethylphosphoramide. The results are given in Table III, columns F, G, K and L, wherein columns F and G represent the polymerization of propylene with a Ziegler-type catalyst system containing the aluminum chloride-hexamethylphosphoramide coordination complex and columns K and L represent the corresponding control experiments, i.e., those experiments performed with a Ziegler-type catalyst system containing hexamethylphosphoramide.

The values for the molecular weight, density and tensile strength in columns F and G are much higher than those in columns K and L respectively, indicating that Following the procedures as indicated in Examples 1 and 2, a variety of coordination complexes can be used in combination with group II–III activators and Group IV–VI transition metal compounds for the polymerization of propylene, butene-1, 4-methylpentene-1 and styrene. For example, the aluminum chloride and aluminum bromide complexes of tributyl phosphine oxide, triphenyl phosphate, hexamethylphosphoramide, triethylamine and triethylamine oxide, and the aluminum chloride coordination complexes of tetrahydrofuran, tetrahydrothiophene, tributylamine and 1,4-diazabicyclo(2,2,2)octane are useful in improving the catalytic activity and/or stereospecificity of such Ziegler-type catalysts, as $(C_2H_5)_2AlOC_2H_5/TiCl_3$, $(C_2H_5)_2Zn/Ti(OC_2H_5)_3$, $(C_2H_5)_2AlBr/TiBr_3$, $C_2H_5ZnCl/TiCl_3$, $(C_2H_5)_2AlCl/CrCl_3$, $C_2H_5AlCl_2/TiCl_2$, $(C_2H_5)_2AlCl/VCl_3$, $C_4H_{10}MgBr/TiCl_3$, and $(C_2H_5)_2InCl/TiCl_3$ Although the catalyst preparations in the examples were done batchwise, it is obviously within the scope of this invention to prepare catalysts continuously or batchwise and to utilize either preparation in continuous or batch polymerizations.

The advantages of this invention will be apparent to the skilled in the art. Improved catalyst systems of increased activity and stereospecificity are made available for producing polymers of superior characteristics as regards crystallinity and mechanical properties.

It is to be understood that this invention is not limited to the specific examples which have been offered merely as illustrations and that modifications may be made without departing from the spirit of the invention.

What is claimed is:

1. A three-component polymerization catalyst consisting essentially of:
   (a) a first component selected from the group consisting of metals, metal hydrides, alkyl metal compounds and aryl metal compounds wherein the metal is selected from Groups I–III and the alkyl or aryl radicals contain 1–8 carbon atoms;
   (b) a second component comprising a Group IV–VIII transition metal compound;
   (c) a third component selected from the group consisting of aluminum halide coordination complexes of amines, amides, ethers, phosphates, thiophenes and phosphine oxides, the molar ratio of the first component to the second component being in the range of 0.1:1 to 10:1 and the molar ratio of the second component to the third component being in the range of 0.2:1 to 5:1.

2. A catalyst system as in claim 1 wherein the first component is diethyl aluminum chloride; the second component is titanium trichloride; the third component is the aluminum chloride coordination complex of triethylamine.

3. A catalyst system as in claim 1 wherein the first component is diethyl zinc; the second component is titanium trichloride; the third component is the aluminum chloride coordination complex of hexamethylphosphoramide.

4. A catalyst system as in claim 1 wherein the first component is ethyl aluminum dichloride; the second component is titanium trichloride; the third component is the aluminum chloride coordination complex of hexamethylphosphoramide.

5. A catalyst system as in claim 1 wherein the first component is diethyl aluminum chloride; the second component is titanium trichloride; the third component is the aluminum chloride coordination complex of hexamethylphosphoramide.

6. In a process for polymerizing α-monoolefinic hydrocarbons containing from 2–8 carbon atoms to form solid crystalline polymers, the improvement which comprises catalyzing the polymerization with the catalyst system of claim 1.

7. In a process for polymerizing propylene to form a solid crystalline polymer, the improvement which comprises catalyzing the polymerization with the catalyst system of claim 3.

8. In a process for polymerizing propylene to form a solid crystalline polymer, the improvement which comprises catalyzing the polymerization with the catalyst system of claim 4.

9. In a process for polymerizing propylene to form a solid crystalline polymer, the improvement which comprises catalyzing the polymerization with the catalyst system of claim 5.

10. In a process for polymerizing propylene to form a solid crystalline polymer, the improvement which comprises catalyzing the polymerization with the catalyst system of claim 6.

References Cited by the Examiner

UNITED STATES PATENTS

| | | | |
|---|---|---|---|
| 3,032,510 | 5/1962 | Tornqvist | 260—94.9 |
| 3,116,274 | 12/1963 | Boehm | 260—94.9 |

FOREIGN PATENTS 1,231,089   4/1960   France.

JOSEPH L. SCHOFER, *Primary Examiner.*

F. L. DENSON, *Assistant Examiner.*